United States Patent [19]
Trahan

[11] 3,710,627
[45] Jan. 16, 1973

[54] GYROSCOPIC-ACTION DYNAMIC BALANCER

[76] Inventor: Albert J. Trahan, 1717 5th Street, Lake Charles, La. 70601

[22] Filed: Aug. 14, 1970

[21] Appl. No.: 63,807

[52] U.S. Cl. ............................................. 73/464
[51] Int. Cl. ............................................. G01m 1/22
[58] Field of Search .......... 73/464, 478, 462, 465–467

[56] References Cited

UNITED STATES PATENTS

| | | | |
|---|---|---|---|
| 2,054,267 | 9/1936 | Ohlson | 73/464 |
| 2,487,035 | 11/1949 | Weaver et al. | 73/477 X |
| 2,325,144 | 7/1943 | Marsh | 73/478 X |
| 3,151,485 | 10/1964 | Federn et al. | 73/462 |
| 2,828,911 | 4/1958 | Lash | 73/464 |
| 2,348,922 | 5/1944 | Pekar | 73/462 |
| 2,228,011 | 1/1941 | Lundgren | 73/464 |
| 2,088,553 | 7/1937 | Olsen | 73/478 |

FOREIGN PATENTS OR APPLICATIONS 944,585 6/1956 Germany ............................ 73/462

Primary Examiner—James J. Gill
Attorney—Berman, Davidson and Berman

[57] ABSTRACT

A dynamic balancer for a wheel and axle assembly consisting of an upstanding supporting frame in which a rectangular swingable axle-bearing carriage is suspended by four flexible corner cables. The carriage can be clamped to pivot on a vertical axis beneath either wheel so as to allow the respective wheels to be separately balanced. A drive motor is coupled to a double wheel and axle assembly journaled on the carriage through a shaft including a two-segment wave rectification commutator engaged by diametrically opposite angularly adjustable brushes connected in a circuit including a meter and respective selectable magnetic transducer assemblies mounted on the supporting frame and having cooperating movable signal generating elements secured to the carriage, to thereby generate signals corresponding to the horizontal forward and rearward excursions of the carriage caused by unbalance of the wheels as the wheel and axle assembly rotates. The brushes can be adjusted so that their phase positions correspond with that of the forward and rearward excursions, and so that the degree of adjustment, measured on an angle scale, provides information to establish the angular location for securing balancing weights on the wheels.

13 Claims, 10 Drawing Figures

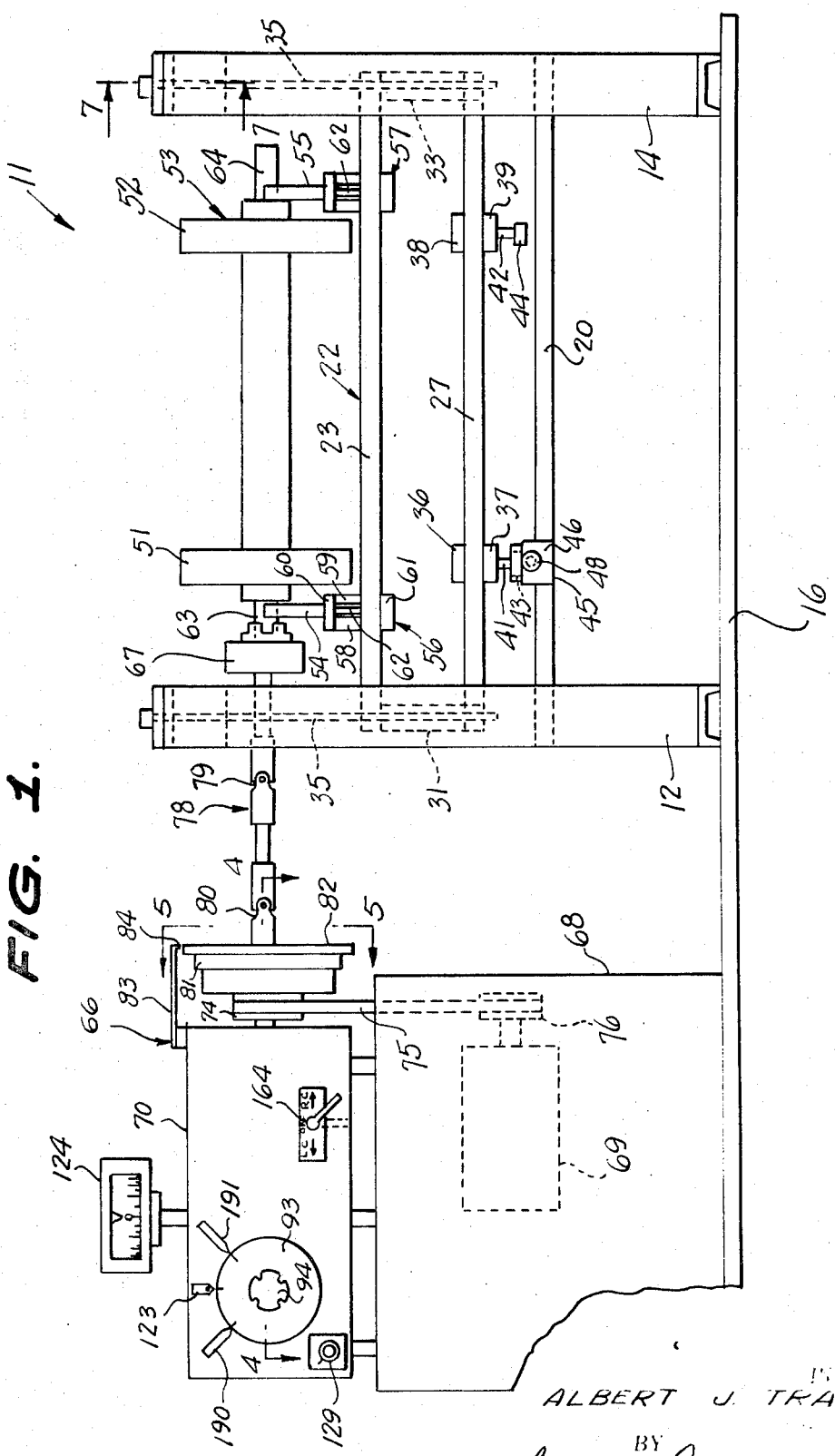

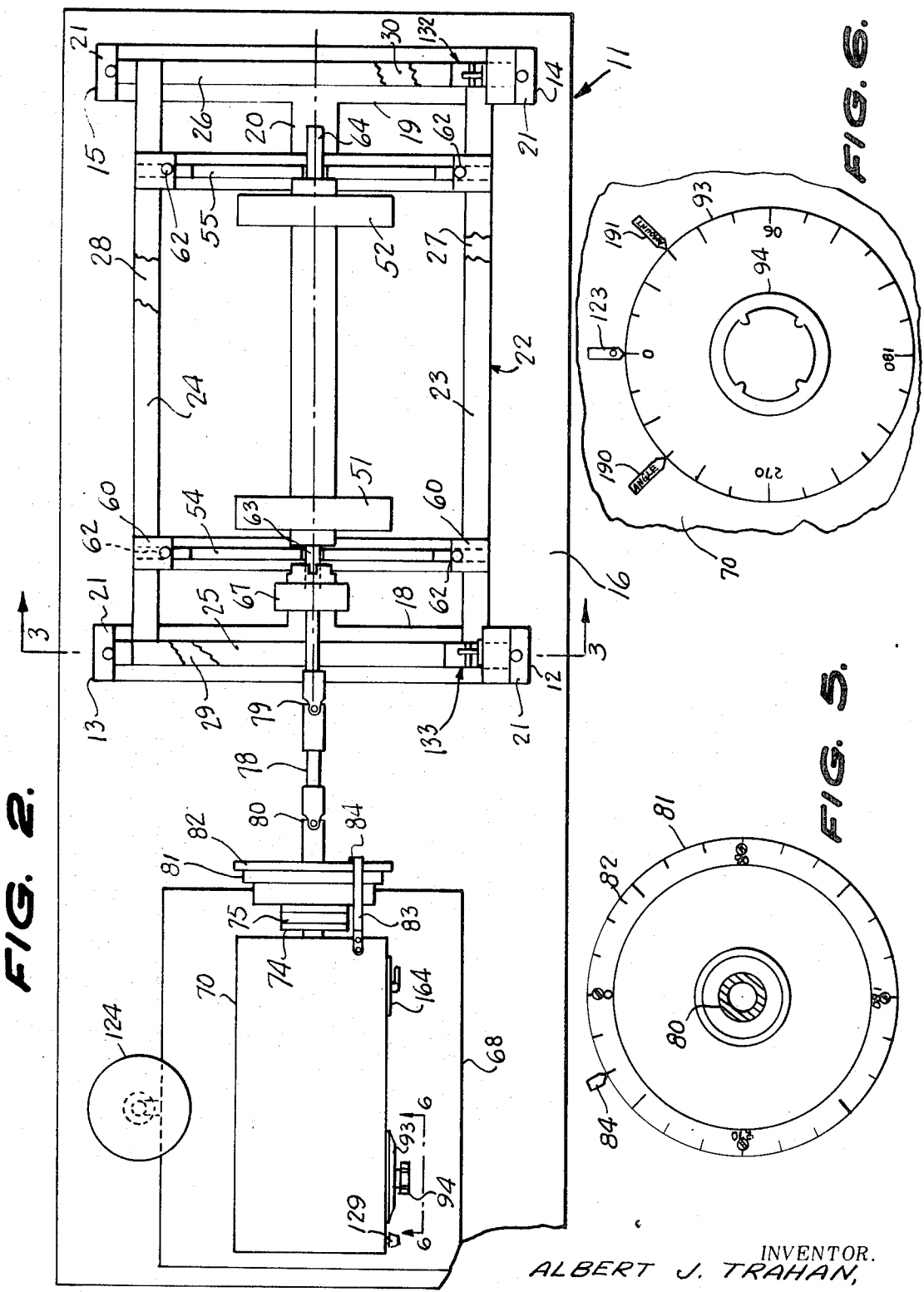

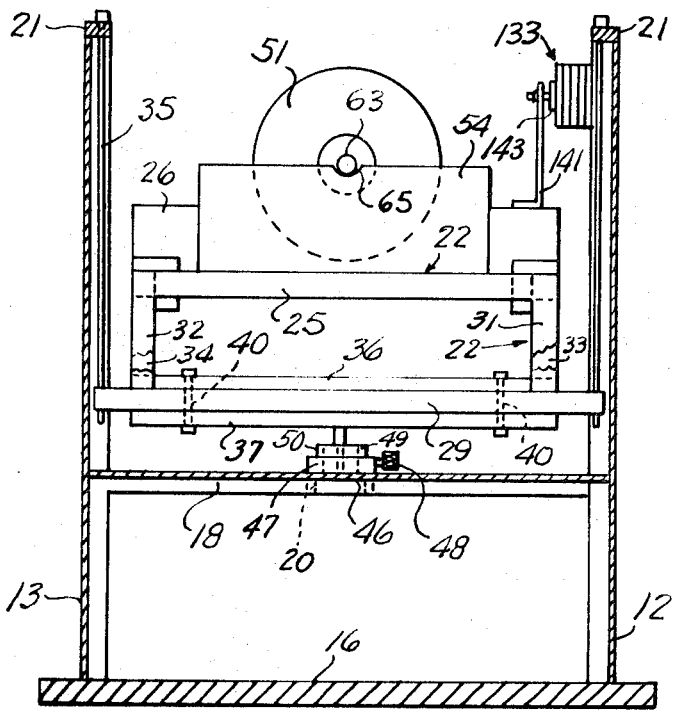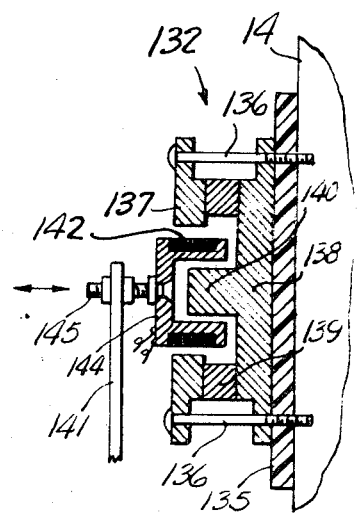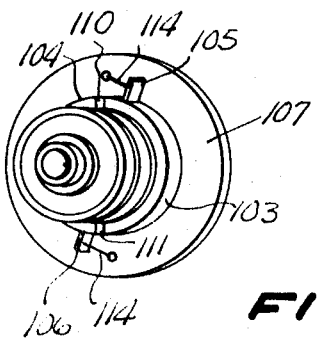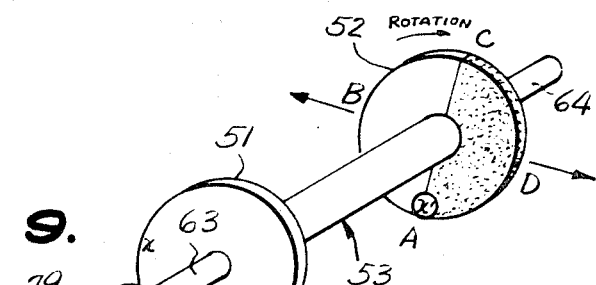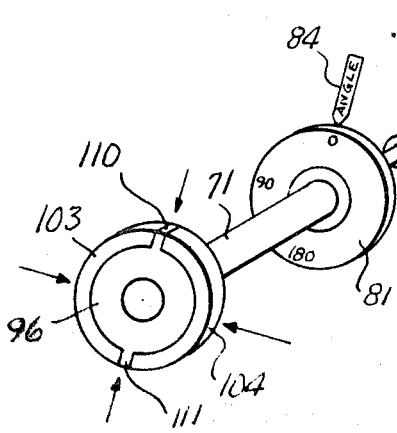

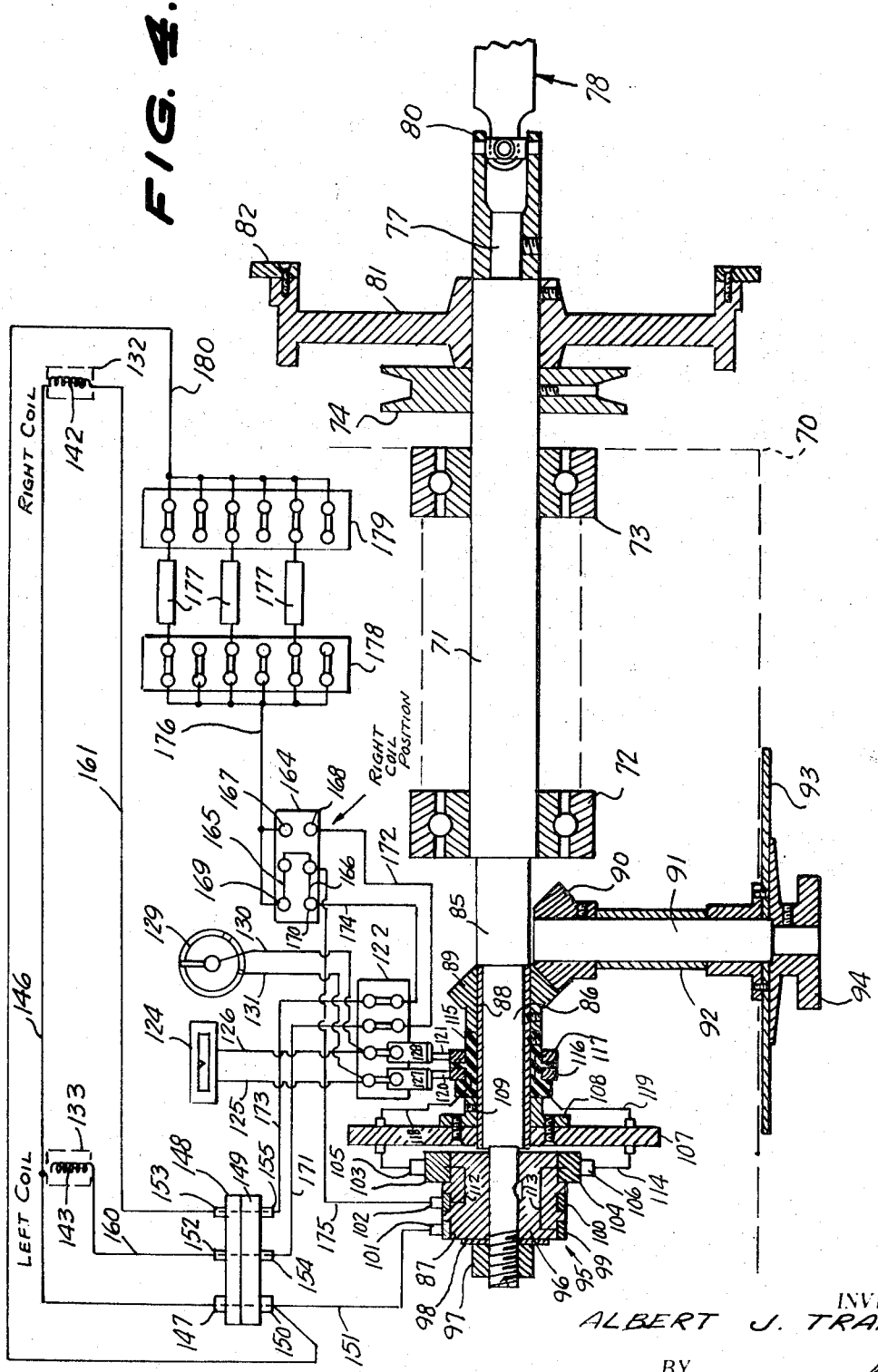

GYROSCOPIC-ACTION DYNAMIC BALANCER

This invention relates to balancing machines for use in the art of balancing rotatable bodies, and more particularly to balancing machines of the type having selectable pivot-forming means so that a body being tested for balance can rotate around a selected pivot point.

The main object of the invention is to provide a novel and improved gyroscopic-action dynamic balancer which is relatively simple in construction, which is easy to operate, and which is especially adapted for balancing rotating bodies of the wheel and axle type.

A further object of the invention is to provide an improved balancing machine including improved and novel pivot-forming mechanism which can be employed to establish a selected pivot support for vibratory movements of a rotating body under test, the machine being smooth in operation, being relatively compact in size, and providing accurate results.

A still further object of the invention is to provide an improved gyroscopic-action dynamic balancing machine for balancing rotating bodies, such as wheel and axle assemblies, the machine involving relatively inexpensive components, being durable in construction, and employing highly sensitive motion-transducing means providing electrical signals corresponding to excursions of the rotating body under test, the signals being utilized to provide information which locates points at which suitable weights may be attached to portions of the body under test so as to establish true dynamic balance therein.

A still further object of the invention is to provide an improved gyroscopic-action dynamic balancing machine for detecting unbalance of rotating bodies, for example, wheel and axle assemblies, the machine being provided with pivot-forming means so that suitable pivot points may be established, facilitating the separate balancing of respective wheels on a double-wheel and axle assembly, and being provided with electrical unbalance detection means and with associated angle-measuring equipment for locating positions at which balancing weights may be attached to the wheels to compensate for unbalance thereof, the apparatus being further provided with means for compensating for mechanical and inductive lag effects.

Further objects and advantages of the invention will be apparent from the following description and claims, and from the accompanying drawings, wherein:

FIG. 1 is a fragmentary elevational view of an improved gyroscopic-action dynamic balancing machine constructed in accordance with the present invention, shown with a double-wheel and axle assembly mounted therein in position for balancing same.

FIG. 2 is a top plan view of the machine of FIG. 1.

FIG. 3 is a transverse cross-sectional view taken substantially on line 3—3 of FIG. 2.

FIG. 4 is a horizontal cross-sectional view to a somewhat enlarged scale, taken substantially on the line 4—4 of FIG. 1, taken through the main driving shaft and associated parts of the machine of FIGS. 1 and 2, and showing in a diagrammatic form the electrical connections associated with the unbalance-detecting transducers of the machine.

FIG. 5 is an enlarged fragmentary vertical cross-sectional view taken substantially on line 5—5 of FIG. 1.

FIG. 6 is an enlarged fragmentary elevational view of the brush-positioning dial of the machine of FIGS. 1 and 2, said view being taken substantially on line 6—6 of FIG. 2.

FIG. 7 is an enlarged transverse cross-sectional view taken substantially on line 7—7 of FIG. 1.

FIG. 8 is rear perspective view of the commutator and associated brush-carrying disk employed in the machine of FIGS. 1 to 7.

FIG. 9 is a perspective view in generally schematic form showing the main driving shaft and parts associated therewith to drivingly couple to a double wheel and axle assembly to be balanced, as illustrated in FIGS. 1 and 2, shown to facilitate the description of the procedure employed in using the machine.

FIG. 10 is a graph showing the wave form of a signal generated by an unbalance-detecting transducer of the machine with the arrangement corresponding to the diagrammatic showing of FIG. 9.

Referring to the drawings, 11 generally designates an improved dynamic balancing apparatus constructed in accordance with the present invention. The apparatus 11 comprises an upstanding supporting frame of generally rectangular shape consisting of respective pairs of transversely aligned vertical corner posts 12, 13, 14 and 15 rigidly secured at their bottom ends to a rectangular base plate 16. The posts 12 and 13 are rigidly connected together at about one-third their height by a horizontal cross-bar 18, and the vertical post members 14 and 15 are similarly rigidly connected together by a horizontal transverse cross-bar 19 located at the same level as the cross-bar 18. A longitudinal rail member 20 rigidly connects the center portions of the transverse bar members 18 and 19.

Rigidly secured on the top ends of the vertical post members are inwardly projecting blocks 21, and suspended from said blocks is a swingable rectangular carriage designated generally at 22.

The carriage 22 comprises a rectangular box-like frame having the top longitudinal side bars 23, 24 connected by top transverse cross-bars 25 and 26 and bottom longitudinal side bars 27 and 28 connected by the transverse cross-bars 29 and 30, the corners of the frame comprising vertical corner posts 31 and 32 at one end of the frame and corner posts 33 and 34 at the other end.

The vertical stationary corner posts 12, 13, 14 and 15 comprise channel-shaped bars, and the blocks 21 at their top ends are secured so as to define closures for the channel-shaped posts. The transverse bottom cross-bars 29 and 30 of the swingable frame 22 have end portions projecting into the vertical channel-shaped post members 12, 13, 14 and 15, and the frame is suspended by means of flexible cables 35 connecting the ends of transverse cross-bars 29 and 30 to the blocks at the top ends of the respective channel-shaped post members 12, 13, 14 and 15.

Adjustably clamped transversely on the lower longitudinal bar members 27 and 28 are respective pairs of cross-bars 36, 37 and 38, 39, the pairs of cross-bars being clamped at adjusted positions on the longitudinal bar members 27 and 28 by clamping bolts 40,40 located inwardly adjacent the longitudinal bar members 27 and 28 of the swinging frame 22. The lower cross-bars 37 and 39 are provided at their center portions with respective depending pivot shafts 41 and 42 provided at their bottom ends with ball-bearing assemblies 43 and 44. Adjustably mounted on the longitudinal center rail member 20 is a clamping block assembly 45 consisting of opposing segments 46 and 47 shaped to slidably receive the rail 20 therebetween and provided with a clamping screw 48 which is suitably shouldered to exert clamping pressure between the segments 46 and 47 when tightened. Thus, the screw 48 may be threadably engaged in the segment 47 and extend through a suitable bore provided therefor in the segment 46, and may be suitably shouldered to exert clamping force on the segment 46 when it is tightened. This locks the assembly 45 at a desired location along the rail 20.

The clamping segments 46 and 47 are provided with opposing recessed semicircular seat portions 49 and 50 defining a clamping socket to receive the outer race of either ball-bearing assembly 43 or ball-bearing assembly 44 and being adapted to be clamped thereto when the clamping screw 48 is tightened. Thus, a pivot connection may be provided either at the shaft 41 or at the shaft 42 by means of the clamping block assembly 45. As it will be presently explained, this enables the frame 22 to pivot around either an axis defined by the shaft 41 or an axis defined by the shaft 42, said shafts being positioned so as to be located in the desired transverse vertical planes, for example, in the planes of the respective wheels 51 and 52 of a double-wheel and axle assembly 53 journaled on the carriage 22 for balancing.

The wheel and axle assembly 53 is journaled on the carriage 22 by means of a pair of adjustable bearing brackets 54 and 55 which are adjustably clamped upon the top longitudinal bar members 23 and 24. The bearing brackets 54 and 55 are supported on respective transverse beam assemblies 56 and 57, each comprising a pair of parallel transversely extending rectangular upstanding plate members 58 and 59 between which the bearing brackets are rigidly secured, the plate members being connected rigidly at their end portions by top bridging plates 60,60. The transverse beam assemblies also include transversely extending cross-bars 61 which underlie the longitudinal bar members 23, 24 and which are clamped thereto by clamping bolts 62,62 extending through the top plates 60 and the end portions of the bottom bars 61 inwardly adjacent the longitudinal carriage bars 23, 24. This arrangement allows the transverse beam assemblies 56 to be adjustably secured on the top longitudinal bars 23, 24 of the swingable carriage assembly 22.

In the typical arrangement illustrated in the drawings, the bearing brackets 54 and 55 are arranged to rotatively support the opposite shaft end portions 63 and 64 of the wheel and axle assembly 53, said shaft end portions being received in respective semicircular bearing notches 65 centrally provided in the top edges of the bearing brackets 54 and 55, as shown in FIG. 3.

The wheel and axle assembly 53 is rotated by a driving assembly, designated generally at 66 and having a drive chuck 67 to which the end shaft element 63 is drivingly connected.

The driving assembly 66 comprises a lower housing 68 mounted on base plate 16 in which is suitably mounted an electric driving motor 69. Mounted on the lower housing 68 is an upper housing 70, and longitudinally journaled in housing 70 substantially in axial alignment with the semicircular journaled bearing notches 65,65 of the bearing brackets 54 and 55 is a shaft 71. As shown in FIG. 4, the shaft 71 may be journaled in the housing 70 by means of spaced ball-bearing assemblies 72 and 73 suitably supported in housing 70. Secured on shaft 71 externally adjacent the right transverse end wall of housing 70, as viewed in FIG. 1, is a pulley 74 which is drivingly coupled by means of a drive belt 75 to an output pulley 76 provided on the shaft of the electric motor 69.

Shaft 71 has a reduced right-end portion 77 which is drivingly connected to the chuck 67 by means of an articulated shaft assembly 78 including a pair of universal joints 79 and 80.

Secured on the shaft 71 inwardly adjacent the reduced end portion 77 is a circular angle dial 81 having a peripheral angle scale 82. An index bar 83 is secured to the top wall of the upper housing 70 and is provided with an end pointer element 84 which is bent so as to extend adjacent to and radially with respect to the angle scale ring 82, as shown in FIG. 5, so as to serve as an index marker with respect to the angle scale on the ring.

Shaft 71 is provided at its left end portion, as viewed in FIG. 4, with the successively reduced portions 85, 86 and 87. A sleeve 88 is rotatably mounted on the shaft portion 86, and rigidly secured on the right end portion of sleeve 88, as viewed in FIG. 4, is a bevelled gear 89. Bevel gear 89 is meshingly engaged by another bevelled gear 90 secured on the end of a shaft 91 extending perpendicular to the shaft 71 and being suitably journaled in the housing 70, for example, on a suitable bearing bracket having a bearing bushing 92. Shaft 91 extends to the front wall of the housing 70 and has secured thereto a circular angle dial 93 provided with a central knob 94.

Secured on the reduced left end portion 87 of shaft 71 is a commutator assembly, designated generally at 95, comprising a main body 96 of insulating material of generally cylindrical shape which is keyed to shaft portion 87 and which is retained thereon by a nut 97 threadedly engaged on the outer end portion of the shaft element 87, bearing against a washer 98 provided between said nut and body 96. Mounted on the body are a pair of circular collector rings 99 and 100 which are conductively engaged by suitably mounted stationary brushes 101 and 102. The commutator assembly 95 also is provided with a pair of substantially semicircular concentric commutator segments 103 and 104 which are engagable by angularly adjustable brushes 105 and 106 which are diametrically mounted relative to body 96 on a supporting disc 107 rigidly secured to the sleeve 88. Thus, the disc 107 has a central aperture receiving the left end of sleeve 88, and said disc is rigidly secured to a bushing 108 surrounding the sleeve 88 and locked thereto by means of a set screw 109, as shown in FIG. 4.

As shown in FIG. 8, the diametrically opposed brushes 105 and 106 are narrower than the insulating gaps 110 and 111 between the ends of the generally semicircular commutator segments 103 and 104, so as to avoid short circuiting the commutator segments.

As shown in FIG. 4, the commutator segment 103 is connected by a conductor 112 to the collector ring 100 and the commutator segment 104 is connected by a conductor 113 to the collector ring 99. Thus, the respective commutator segments 103 and 104 are conductively connected to the brushes 102 and 101 through the collector rings 100 and 99.

The brushes 105 and 106 are suitably secured to and supported by spring wires 114 secured to the disc 107. Secured on the sleeve between gear 89 and bushing 108 is an annular body of insulating material 115 on which are mounted a pair of collector rings 116 and 117. Collector ring 116 is connected by a conductor 118 to the brush 105 and the collector ring 117 is connected by a conductor 119 to the brush 106. Conductor rings 116 and 117 are engaged by respective stationary brushes 120 and 121 carried on a terminal block 122 suitably mounted in housing 70.

It will be apparent therefore, from FIG. 4, that the angular position of the diametrically opposed brushes 105 and 106 can be varied, around the axis of shaft 71, by means of knob 94 and its associated angularly calibrated dial 93. The front wall of housing 70 is provided with a center index marker 123 located adjacent the periphery of the angularly calibrated dial 93, as shown in FIG. 6.

Suitably mounted on the housing 70 is a D.C. microammeter 124 which is connected by wires 125 and 126 to respective terminals of block 122 which are connected to the brushes 120 and 121 and which are designated respectively at 127 and 128. A rheostat 129 is mounted on the front wall of housing 70 and its terminals are connected across the terminals 127 and 128 by wires 130 and 131.

The rheostat 129 is employed as an adjustable shunt resistor across the micro-ammeter 124 to adjust its sensitivity.

Respective deflection-sensitive transducer assemblies 132 and 133 are employed between the stationary vertical post members 14 and 12 and the adjacent corner portions of the swingable carriage 22. These transducer assemblies are identical in construction, and therefore it will be necessary to describe in detail only one of them, for example, the transducer assembly 132 illustrated in cross-sectional view in FIG. 7. As shown in FIGS. 3 and 7, each transducer assembly comprises an insulating base plate 135 secured to the associated stationary post member, for example, post member 14 in FIG. 7, and held thereagainst by securing bolts 136 threadedly engaged in the associated post member. As shown in FIG. 7, the bolts 136 extend through a front steel ring 137 and a rear steel back plate 138, the members 137 and 138 being annular in shape, and clamping therebetween a permanent magnet ring 139. The annular steel plate member 138 is provided with a central projection 140 serving as a core, said projection being centrally located relative to the annular members 137 and 139.

Secured on the transversely extending members 25 and 26 of carriage 22 are respective L-shaped upstanding brackets 141 to the top ends of which are secured coil units 142 and 143, each unit being wound on a cup-shaped core member 144 receiving the adjacent projection 140 in the manner illustrated in FIG. 7. The cup-shaped core member 144 is secured to the adjacent bracket 141 by an axial bolt 145 provided with suitable fastening nuts for rigidly clamping the bolt 145 to the cup member 144 and also to the cup end portion of the bracket 141.

As will be readily apparent, horizontal movement of the coils 142 and 143 relative to their associated permanent magnet rings 139 will induce corresponding signals in the coils, said signals being in accordance with the direction and magnitude of the movements, as will be presently described. If the movements are in the nature of simple harmonic movement, the signals will be correspondingly of sine wave form, for example, as illustrated in FIG. 10.

As shown in FIG. 4, each of the coils 143 and 142 has one terminal thereof connected to a common wire 146 which is in turn connected to a terminal 147 of a polarized plug and socket assembly 148, the socket element 149 thereof being mounted on a suitable wall portion of the housing 70. The socket member 149 has a terminal 150 which is electrically connected to the corresponding terminal 147 when the plug and socket unit 148 is in operatively connected relationship, namely, when the plug element thereof is engaged in the socket element 149 thereof. The socket terminal 150 is connected by a wire 151 to brush 101 which conductively engages slip ring 99 and which is suitably mounted within the housing 70. The plug element of the connector assembly 148 is similarly provided with additional terminals 152 and 153 which are in conductive connection with corresponding terminals 154 and 155 of the socket member 149 when the plug is engaged in the socket. The remaining terminal of detector coil 143 is connected by a wire 160 to the plug terminal 152 and the remaining terminal of the detector coil 142 is connected by a wire 161 to the plug terminal 153.

A double-pole, double-throw reversing switch assembly 164 is mounted on the front wall of housing 70, said switch unit having the poles 165 and 166 and having one pair of stationary contacts 167 and 168 which can be engaged by the poles in one position of the switch, as shown in FIG. 4, and having another pair of contacts 169 and 170 which can be engaged by the poles in the opposite position of the switch. Socket terminal 154 is connected by wires 171 and 172 through bridged terminals of block 122 to switch contact 168, and socket terminal 155 is similarly connected by wires 173 and 174 through bridged terminals of block 122 to switch contact 170. Slip ring brush 102 is connected by a wire 175 to the poles 166 and 165 of switch 164, said poles being connected together. The remaining stationary contacts 169 and 167 of the switch are connected through a common wire 176 to one terminal of each of the plurality of capacitors 177.

As shown in FIG. 4, the capacitors 177 are connected through terminal blocks 178 and 179 respectively between wire 176 and another wire 180 which is in turn connected to socket terminal 150. The capacitors 177 are thus connected in parallel between wires 176 and 180 and are therefore connected across coil 142 in the electrical state of switch 164 shown in FIG. 4 and are connected across the coil 143 when the switch is reversed, as will be presently described. A suitable amount of capacitance is employed to provide necessary compensation for inductive and mechanical lag effects, as will be presently explained.

As above explained, the angle dial 81 and the two-segment commutator 95 are rigidly secured on the same shaft, and the zero point on the angle scale 82 of dial 81 corresponds to the location of the insulating separator element 110 between the commutator segments 103 and 104. The 180° point on said angle scale corresponds to the location of the insulating segment 111 between commutator segments 103 and 104. Thus, with frame 22 constrained to pivot around a vertical axis in the plane of the left wheel 51 of the wheel and axle assembly 53, as shown in FIG. 1, a weight $x'$ secured to the peripheral portion of wheel 52 at the 180° location thereon, as measured on the angle scale 82, would cause consecutive backward and forward oscillation of the frame 22 horizontally responsive to the rotation of the assembly 53 at a constant speed, for example, in a clockwise direction, as illustrated in FIG. 9.

The transducer coil 142 therefore swings inwardly and outwardly with respect to its associated magnetic field produced by the permanently magnetized ring 139 adjacent to the (oil 142 and induces a corresponding signal voltage in the coil whose wave form is similar to that shown in FIG. 10.

The transducer assembly has a characteristic such that the generated voltage, as shown in FIG. 10, is in accordance with the movement of the carriage 22. This, in the abovementioned assumed typical condition wherein a known unbalancing weight $x'$ is located at a known radial distance at the 180° point on wheel 52, the carriage swings rearwardly while the weight $x'$ is traveling clockwise starting from a position approximately shown at A to position C in FIG. 9. This generates the negative lobe of the transducer voltage wave in FIG. 10. The carriage 22 swings forwardly while the weight $x'$ is traveling from position C to position A, thereby generating the positive lobe of the transducer voltage wave in FIG. 10.

Since the coil connections are reversed along with the changes in direction of swinging movement (by the cooperation of the brushes 105, 106 with the commutator segments 103, 104), the meter 124 indicates an effective value of voltage, which depends, among other things, upon the setting of the dial 93. With the setting shown in FIG. 6, the above-described conditions will provide a voltage indication on meter 124 which is about 50 percent of maximum. The voltage reading can be reduced to zero by rotating dial 93 counterclockwise through an angle of about 45°, namely, to bring the zero mark on the dial adjacent an "angle" marker 190 provided on the adjacent front panel of housing 70. The reading provided by marker 190 and dial 93 locates the unbalancing weight on wheel 52 as being 180° opposite the indicated angle value on dial 93, and thus directly gives the angular location for the placement on the wheel of a compensating balancing weight.

The voltage reading can be maximized by rotating dial 93 clockwise. In the above-described typical case, this can be done by rotating dial 193 clockwise from the position of FIG. 6, and can be done by bringing the zero mark on dial 93 adjacent an "amount" marker 191 provided on the front panel of housing 70, spaced about 45° clockwise from marker 123. As shown in FIG. 6, the zero voltage marker 190 is spaced about 45° counterclockwise from the marker 123.

The maximum voltage reading provided by bringing the zero point of dial 93 adjacent the marker 191, in the above-mentioned typical case, corresponds to the magnitude of the required compensating balancing weight to be placed on the wheel at the same radial distance as $x'$, since it measures the magnitude of the weight at said radial distance causing the wheel unbalance.

As shown in FIG. 10, the transducer voltage is positive for forward movement of carriage 22 and negative for rearward movement of said carriage. The polarity of the unbalance voltage indicated on meter 124 will depend on the angular location of the unbalance weight relative to the zero point on the angle dial 81.

The above-described operation takes place with the carriage 22 constrained to pivot around the axis of shaft 41. For balancing the left wheel 51, containing, for example, an unbalancing weight $x$, the carriage 22 is constrained to pivot around the axis of shaft 42 by the use of the clamping assembly 45, as above described, with switch 164 reversed, whereby transducer 133 is employed instead of transducer 132.

In this invention, a sufficient number of capacitors 177 are employed to substantially compensate for the effects of mechanical and inductive lag.

In operation, let it be assumed that it is desired to balance the wheels 51 and 52 of an unbalanced wheel and axle assembly 53. The assembly is placed on the carriage and drivingly coupled to chuck 67 and the carriage is clamped so as to pivot around the axis of shaft 41, as above-described. Thus, the first balancing operation will be on the wheel 52. Switch 164 is in the position of FIG. 4, activating transducer 132. Motor 69 is energized, causing the assembly 53 to rotate. Assume that dial 93 is in its zero position with its zero point adjacent marker 123. With an unbalance similar to $x'$ above described, meter 124 will provide a positive voltage indication. Dial 93 is then rotated counterclockwise to reduce the meter reading to zero. The reading on dial 93 at marker 190 is the angle of unbalance, namely, the angle from marker 84 relative to scaLe 82 at which a balance weight must be mounted on wheel 52.

The next step is to rotate dial 93 clockwise to maximize the reading of meter 124. This brings the previously located angle value on dial 93 adjacent the marker 191 (as a result of clockwise rotation of dial 93 through an angle of approximately 90°). The meter maximum reading would correspond to the amount of balancing weight needed.

The balancer is stopped and the required balance weight is mounted on wheel 52 at the angular distance from the zero point on scale 82 corresponding to the above-mentioned angle of unbalance.

The same procedure is followed for balancing the left wheel 51, with carriage 22 constrained to pivot around axis 42 and switch 164 reversed from its position of FIG. 4.

In all balancing operations, the starting position of the zero point of dial 93 is adjacent the center marker 123.

The dial readings taken at marker 190 are determined by reducing the meter indications to zero, corresponding to the condition wherein the carriage 22 reaches the end of its swing. Turning the dial 93 in a clockwise direction from index marker 190 to index marker 191 will cause the brushes 105,106 to shift 90° in a counterclockwise direction, as viewed in FIG. 9. At this point, meter 124 indicates maximum voltage. Maximum voltage occurs when the carriage is traveling at maximum rate. The rate of travel of carriage 22 is proportional to the magnitude of unbalance. The voltage reading on meter 124 thus corresponds to weight value.

When assembly 53 is completely balanced, it has no effect on carriage 22 when it is rotated.

The cables 35 are relatively thin, have high tensile strength, are freely flexible, and have very little inherent inertia. Therefore, the use of the cables 35 to support the swingable carriage 22 provides a very high degree of sensitivity, substantially higher than that which would be obtained if the carriage were swingably supported on flexible columns. Furthermore, it will be apparent that by the use of the suspension cables 35 in the manner above described, there is no difference in sensitivity as between the use of the constraining pivotal axis at either shaft 41 or shaft 42.

While a specific embodiment of an improved dynamic balancer for wheel and axle assemblies or for other rotary objects to be balanced has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A dynamic balancer comprising an upstanding support including spaced pairs of vertical corner posts defining a rectangular enclosure, a box-like generally rectangular carriage frame horizontally disposed in said enclosure with its respective corners adjacent the corner posts, said carriage frame having vertically spaced top and bottom rectangular frame panels and respective vertical corner post elements connecting the corners of said rectangular frame panels, respective flexible cables connecting the corners of the carriage frame to the top ends of the first-named corner posts, whereby to suspend the carriage frame for free horizontal swinging movement within said enclosure, a longitudinal median rail member on said support beneath said carriage frame, a clamping block assembly slidably mounted on said rail member, transverse opposing upper and lower cross bar members adjustably clampingly secured to the bottom frame panel of said box-like carriage frame, vertical pivot means connecting the center portion of the lower cross bar member to said clamping block assembly and constraining the carriage frame to rotate horizontally around said pivot means, bearing means on the top frame panel of the carriage frame to rotatably support an object to be balanced, and electrical transducer means connected between at least one corner portion of the carriage frame and the corner post of the support adjacent thereto to generate signals responsive to horizontal swinging movement of the carriage frame produced by the rotation of an unbalanced object on said bearing means.

2. The dynamic balancer of claim 1, and drive means for rotating an object on said bearing means.

3. The dynamic balancer of claim 2, and wherein said drive means comprises a drive shaft, a motor drivingly connected to said drive shaft, and chuck means for drivingly coupling said object to the drive shaft.

4. The dynamic balancer of claim 3, and angle indicating means on said drive shaft.

5. The dynamic balancer of claim 4, and a two-segment commutator on said drive shaft, brush-supporting means adjustably mounted for adjustment around said commutator, diametrically opposed brushes on said brush-supporting means engaging the respective commutator segments, an electrical indicating device, and circuit means connecting said transducer means to said electrical indicating device through said brushes.

6. The dynamic balancer of claim 5, and wherein said brush-supporting means is provided with means indicating the angular position of adjustment thereof around the axis of the commutator.

7. The dynamic balancer of claim 6, and wherein said commutator angular position-indicating means comprises a rotary angle dial, means coupling said angle dial to said brush-supporting means, and a plurality of stationary spaced index markers located adjacent said angle dial and spaced apart by an angle corresponding to approximately 90° of rotation of said brush-supporting means around the commutator.

8. The dynamic balancer of claim 7, and wherein said transducer means comprises respective transducers mounted on the support adjacent the opposite ends of the carriage frame, and means to selectively connect said transducers into said circuit means.

9. The dynamic balancer of claim 8, and electrical capacitor means, and the means to connect said capacitor means into said circuit means in parallel with said transducer means.

10. The dynamic balancer of claim 8, and wherein said transducers have respective stationary portions mounted on corner posts of the support and horizontally movable portions connected to adjacent portions of the carriage frame.

11. The dynamic balancer of claim 10, and wherein said stationary transducer portions comprise permanent magnets and the said movable transducer portions comprise coils located in the magnetic fields of the permanent magnets.

12. The dynamic balancer of claim 11, and wherein said electrical indicating device comprises a zero center meter indicating positive voltage on one side of its zero marker and negative voltage on the other side of its zero marker.

13. The dynamic balancer of claim 12, and wherein said drive shaft includes an articulated portion adjacent said chuck means.

* * * * *